(12) United States Patent  
Staltmeir et al.

(10) Patent No.: US 7,165,659 B2
(45) Date of Patent: Jan. 23, 2007

(54) BLOCK BRAKE DEVICE OF A BOGIE OF A RAIL VEHICLE

(75) Inventors: Josef Staltmeir, München (DE); Erich Fuderer, Fürstenfeldbruck (DE); Peter Wolfsteiner, München (DE); Heinrich Ernstberger, München (DE); Marc-Gregory Elstorpff, München (DE)

(73) Assignee: Knorr-Bremse Systeme fur Schienenfahrzeuge GmbH, Munich (DE)

(*) Notice: Subject to any disclaimer, the term of this patent is extended or adjusted under 35 U.S.C. 154(b) by 229 days.

(21) Appl. No.: 10/770,400

(22) Filed: Feb. 4, 2004

(65) Prior Publication Data
US 2004/0200679 A1 Oct. 14, 2004

(30) Foreign Application Priority Data
Feb. 6, 2003 (DE) ............... 103 04 716

(51) Int. Cl.
*B60T 11/10* (2006.01)

(52) U.S. Cl. .......... 188/52; 188/219.1; 188/226.1; 188/222.6

(58) Field of Classification Search ........... 188/52–55, 188/219.1, 222.6, 228.1, 226.1
See application file for complete search history.

(56) References Cited

U.S. PATENT DOCUMENTS 2,958,398 A * 11/1960 Newell .............. 188/52
3,017,959 A    1/1962 Baechtel
3,088,550 A *  5/1963 Kirk ................. 188/52
4,134,343 A *  1/1979 Jackson .............. 105/167
5,507,368 A *  4/1996 Barefoot .............. 188/52
5,667,040 A    9/1997 Samulak et al.
5,785,159 A    7/1998 Jackson et al.
5,817,375 A   10/1998 Poplawski
6,732,841 B1   5/2004 Emilsson et al.

FOREIGN PATENT DOCUMENTS

| DE | 41 37 375 A1 | 5/1992 |
| EP | 0 217 589 A2 | 4/1987 |
| GB | 2 249 813 A  | 5/1992 |
| WO | WO 00/02756  | 1/2000 |
| WO | WO 00/02756 A1 | 1/2000 |
| WO | WO 01/36247 A1 | 5/2001 |
| WO | WO 02/074601 A1 | 9/2002 |

* cited by examiner

*Primary Examiner*—James McClellan
*Assistant Examiner*—Bradley King
(74) *Attorney, Agent, or Firm*—Barnes & Thornburg LLP

(57) ABSTRACT

A block brake device of a bogie of a rail vehicle containing two wheel sets with two wheels respectively as well as two brake beams each assigned to a wheel axle and extending parallel to the latter, which brake beams carry brake blocks and are mutually connected by way of pressing rods which can be actuated by at least one pressure-medium operated cylinder piston drive for the braking engagement of the brake blocks with assigned braking areas of the wheels. At least a portion of a brake beam forms the cylinder of the cylinder piston drive.

24 Claims, 11 Drawing Sheets

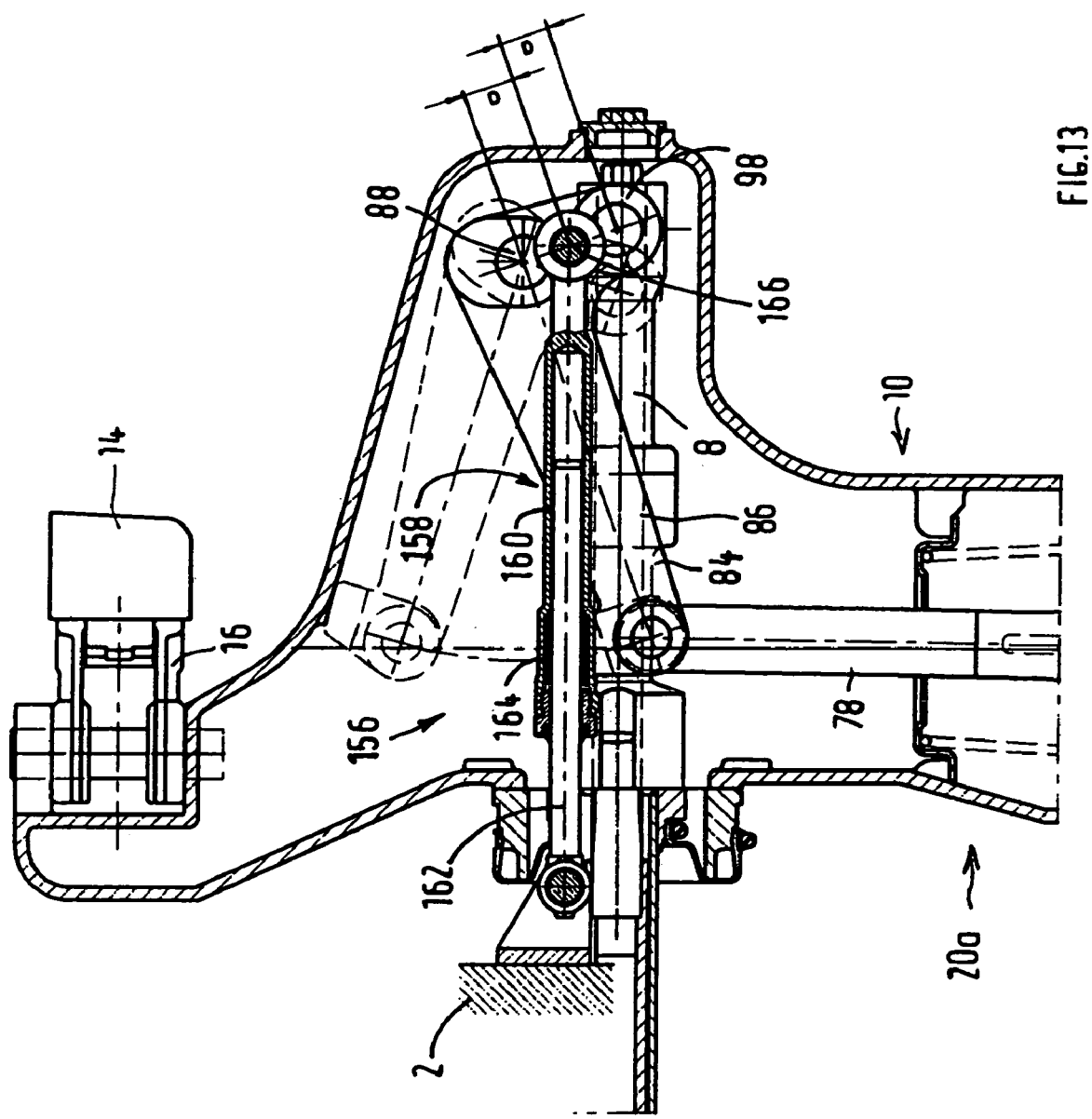

BLOCK BRAKE DEVICE OF A BOGIE OF A RAIL VEHICLE

CROSS-REFERENCE

This non-provisional application claims benefit of and priority to German Application No. 103 04 716.6 filed Feb. 6, 2003, and the disclosure of which is hereby incorporated by reference herein.

BACKGROUND OF THE DISCLOSURE

The invention relates to a block brake device of a bogie of a rail vehicle containing two wheel sets with two wheels respectively as well as two brake beams each assigned to a wheel axle and extending parallel to the wheel axle. The brake beams carry brake blocks and are mutually connected by pressing rods which can be actuated by at least one pressure-medium operated cylinder piston drive for the braking engagement of the brake blocks with assigned braking areas of the wheels.

Such a block brake device is known, for example, from International Patent Document WO 00/02756, in which the brake beams are formed by plate profiles. The plate profile of a brake beam constructed as a U-profile or Z-profile carries two pressure-medium-operated cylinder piston drives as separate independent constructional units which each actuate a pressing rod. The center axes of the cylinder piston drives extend along the cross beams. As a result, the moving-out motion of the pistons takes place parallel to the wheel axles and has to be deflected by deflection gears to pressing rods arranged transversely to the wheel axles. The pressing rods, in the case of a braking, press the cross beams away from one another and press the brake blocks or pads against the wheels.

With respect to the above, it is an object of the present invention to further develop a block brake device of the initially mentioned type such that it can be manufactured in a more cost effective manner and has a lower weight.

SUMMARY OF THE DISCLOSURE

Because at least a portion of the brake beam itself forms the cylinder of the cylinder piston drive, the present device goes farther than the initially mentioned state of the art in which the cylinder of the cylinder piston drive is carried as a separate component by the brake beam which is also constructed as a separate component. In contrast, according to the present device, the brake beam, which is for holding the brake blocks and for transmitting the contact pressure force, simultaneously forms the cylinder of the cylinder piston drive or vice-versa, so that, in comparison to the state of the art, fewer components have to be manufactured and mounted. A self-supporting construction of the at least one cylinder piston drive is therefore implemented by the present device.

According to an embodiment, a cylinder face of the cylinder of the cylinder piston drive is formed directly by an inner circumferential surface of the wall of the brake beam or by a cylinder liner carried by the wall. In contrast to the initially mentioned state of the art, such a cylinder liner, however, does not form a complete cylinder but only a part of the circumference and has to be carried by a stiff wall on its radially outer circumferential surface because it represents no self-supporting component.

Furthermore, the piston stroke is large in comparison to the diameter of the cylinder piston drive. This is advantageous in that a relatively large amount of space exists along the wheel axles, although the installation space is narrow in the upward and downward direction, particularly in the case of bogies with small wheel diameters, as they are customary, for example, in the case of automobile carrier vehicles or container cars.

According to a further development of this embodiment, two coaxial cylinder piston drives, which operate in opposite directions, are integrated in the brake beam. In this case, the brake beam preferably has two identically constructed housing halves which can be symmetrical with respect to a center plane of the bogie and which, at least in sections, form the cylinders of the cylinder piston drives. The two housing halves are constructed, for example, as identical hollow castings and are mutually connected by flanged joints. Because of their construction as identical parts, the housing halves can be manufactured in an advantageous manner and are easy to stock. In addition, such hollow housing parts with an almost completely closed wall have a high moment of resistance with respect to bending and torsion, which is advantageous specifically in view of the high braking forces to be transmitted by the brake beam.

One deflection gearing respectively for deflecting the piston movement to the pressing rods is accommodated in the housing halves in an encapsulated manner, which deflection gearing is arranged behind the cylinder piston drives. As a result, the deflection gearing and particularly its movement bearing points are protected from dirt, splashing water and mechanical effects, which has a wear-reducing result. Furthermore, the receiving devices for the brake blocks are shaped to the housing halves at the end side.

According to an embodiment, an intermediate housing is arranged between the two housing halves. In the intermediate housing, a central pressure medium connection is constructed which supplies both cylinders of the cylinder piston drives with the pressure medium. As a result, it is not necessary to provide two separate pressure medium connections.

In the case of a combination of the service brake with a parking brake, also at least part of an actuating mechanism of the parking brake is accommodated in the intermediate housing. The actuating mechanism of the parking brake comprises, for example, a nut screw drive, which can be rotatorily driven by brake application elements and is coaxial with respect to the cylinder piston drives. The screw is constructed so that it can strike against the pressure side of one piston, and the nut is constructed so that it can strike against the pressure side of the other piston. In this case, the rotating movement is introduced, for example, into the nut. The screw is disposed in a linearly displaceable manner and protected against torsion on the one piston, and the nut is disposed in a linearly displaceable manner but freely rotatably on the other piston. For example, the bearing of the screw and the nut takes place within one centric cup-shaped shaped-out section respectively in the assigned piston. For transmitting the locking brake forces to the pistons, the screw and the nut are provided at the end side with one stop body respectively which is shaped complementarily to a bottom of the shaped-out section of the corresponding piston. Furthermore, the nut of the nut screw drive is preferably axially displaceably and co-rotatably disposed inside a sleeve. The sleeve is disposed in a coaxial, axially fixed and rotatable manner inside the intermediate housing and can be rotatorily driven for the application and release of the parking brake. This results in a floating bearing of the nut screw drive in the intermediate housing, so that the nut screw drive can be axially displaced in order to compensate a different brake block play at the right and the left wheel during the parking braking.

The brake beams, together with the pressing rods, the brake blocks and the cylinder piston drives are fastened by hanging lugs to the bogies. The hanging lugs are swivellably on all sides disposed at one end side on the bogie by spherical bearings with elastically damping elements and linked at the other end side to brake shoes carrying the brake blocks. The hanging lugs transmit the circumferential force acting at the brake blocks in the case of a braking to the bogie. By way of the hanging lugs, the block brake device can be fastened as a completely preassembled brake module to the bogie. The elastically damping elements uncouple the hanging lugs from the bogie and prevent the transmission of structure-borne noise to the bogie, which reduces the noise generated during the braking. The spherical bearing of the hanging lugs on the bogie, on the one hand, permits a swivelling of the hanging lugs about imaginary swivelling axes extending parallel to the wheel axles when the braking force generating devices are actuated. As a result, the wheel-side ends of the hanging lugs move away from one another or toward one another in the horizontal direction. On the other hand, by the swivelling of the hanging lugs about imaginary swivelling axes extending perpendicular to the wheels axles, the brake blocks can follow the transverse axle movements of the wheels and are therefore always situated opposite the braking areas of the wheels.

Wear adjusting devices are integrated in the pressing rods. These wear adjusting devices are used for adjusting the brake block wear, in which case the pressing rods are adjusted to a greater length for this purpose. Here, the pressing rods may be arranged essentially perpendicular to the wheels axles or at an angle with respect to one another and may diverge starting from the brake beam accommodating the cylinder pistons drives. The latter arrangement is particularly advantageous when space is required between the pressing rods, for example, when a cross member of the bogie is pulled downward and the pressing rods have to be guided in a diverging manner laterally past the cross member. Because the linkage points at the other brake beams are moved toward the outside, the bending moment stress upon this brake beam is simultaneously reduced.

These and other aspects of the present disclosure will become apparent from the following detailed description of the disclosure, when considered in conjunction with accompanying drawings.

BRIEF DESCRIPTION OF THE DRAWINGS

FIG. 13 is a partial sectional view of another embodiment of a block brake device.

DETAILED DESCRIPTION OF THE PREFERRED EMBODIMENTS

Figure 1:
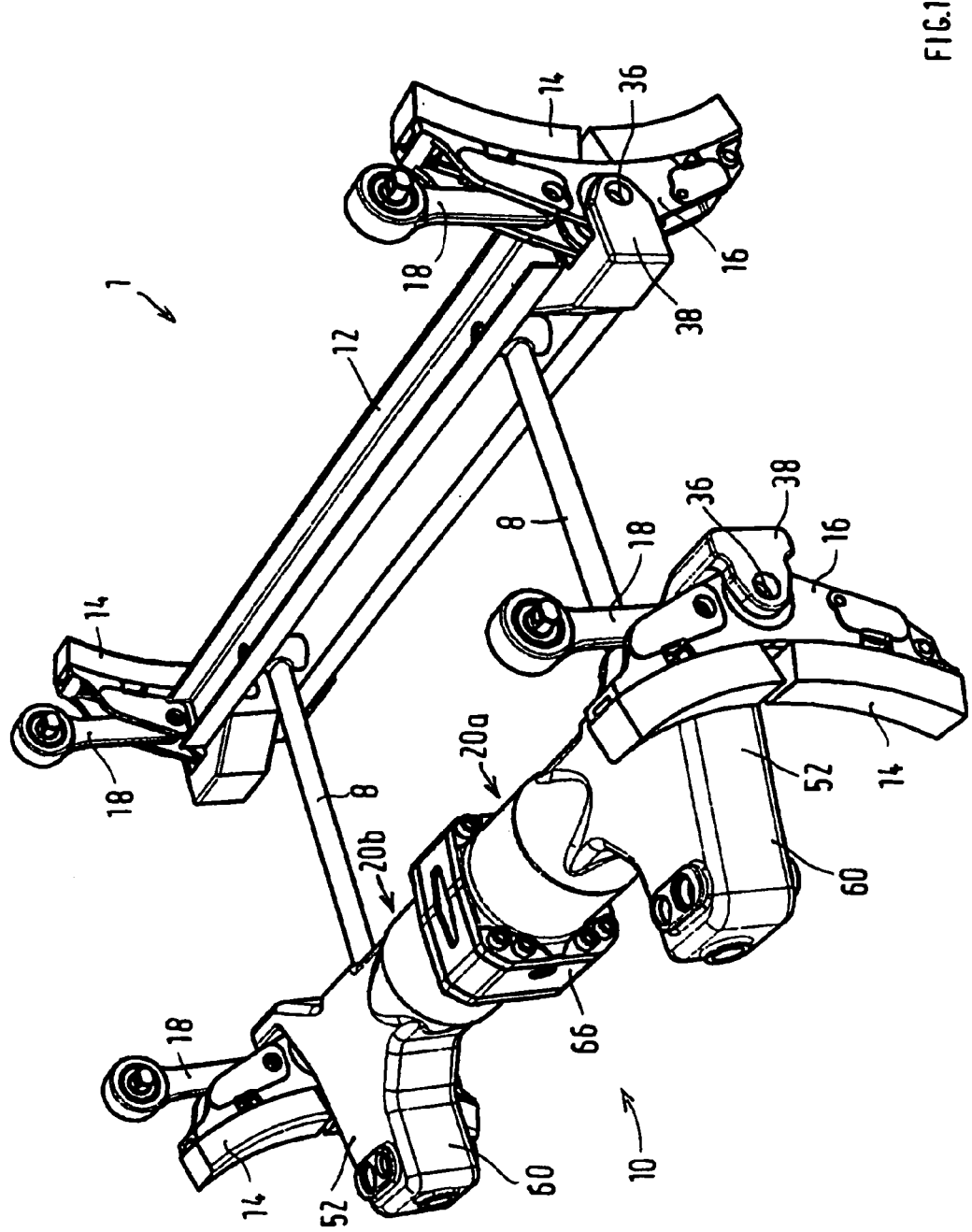
FIG. 1 is a perspective representation of a block brake device according to a first embodiment with a brake beam in the form of a housing which simultaneously forms the cylinders of cylinder piston drives.

FIG. 1 illustrates a block brake device 1 of a railroad freight car according to a preferred embodiment. The block brake device 1, as a whole, is fastened in a hanging manner to a bogie 2 of the railroad freight car illustrated in FIG. 11, which bogie 2 has two wheel sets 4 with two wheels 6 respectively. The block brake device 1 comprises preferably two brake beams 10, 12 mutually connected by pressing rods 8, four brake shoes 16 held at the end side on the brake beams 10, 12 and carrying brake blocks or pads 14, four hanging lugs 18 which, on one side, are linked to the brake beams 10, 12 and, on the other side, are linked to the bogie 2, as well as, for example, two brake actuators 20a, 20b which are accommodated in the one brake beam 10 constructed as a hollow housing and are not visible in FIG. 1. The brake blocks 14 of a brake beam 10, 12 are assigned to the wheels 6 of a wheel axle 22, the brake beams 10, 12 extending approximately parallel to the wheel axles 22. The two wheel sets 4 are spring-mounted in a known manner with respect to the bogie 2. The suspension permits the two wheel sets 4 to carry out, among others, longitudinal and lateral movements relative to the bogie 2.

By admitting pressure medium to the cylinder piston drives 20a, 20b of the brake actuators, the pressing rods 8 are operated such that the brake beams 10, 12 are moved away from one another and, as a result, the brake blocks 14 carried by them are moved against the wheels 6 in the brake application position. According to the first embodiment of FIG. 1, the pressing rods 8 are arranged essentially perpendicular to the brake beams 10, 12.

The hanging lugs 18 are disposed on the bogie 2 so that they can be swivelled preferably on all sides. Here, for example, a spherical block 24 is used as a swivel bearing, that is, a spherical head 28 of a ball pin 30 which is disposed in a rubber sleeve 26 with a complementarily spherical bearing surface, as illustrated in the sectional view of an individual hanging lug 18 according to FIG. 9. The ball pin 30 is preferably constructed as a flat pin with two passage bores 32 at the ends. The flat pin 30 is accommodated on a longitudinal beam of the bogie 2, which longitudinal beam is not shown. The bearing of the hanging lugs 18, which is swivellable on all sides, permits on the one hand that the brake beams 10, 12, together with the brake blocks 14, can follow the transverse movements of the wheels sets in the direction of the wheel axles 22 in order to ensure that they are always situated opposite the braking areas of the wheels 6. On the other hand, the spherical block 24 permits a swivelling of the hanging lugs 18 in the longitudinal or driving direction. Such a swivelling movement takes place, for example, when the brake actuators 20a, 20b are operated and, as a result, the wheel-side ends 34 of the hanging lugs 18 move away from one another or toward one another transversely to the wheel axles 22. Furthermore, such a rotating possibility for the hanging lugs 18 must exist in order to be able to compensate the wear occurring at the brake blocks 14. The hanging lugs 18 therefore have to be swivellable in at least two degrees of rotational freedom with respect to the bogie 2, which can be implemented by any type of spherical bearing or by a sufficiently large play of the bearing of the hanging lugs 18 at the bogie. The rubber sleeve 26 surrounding the spherical head 28, because of a restoring moment resulting from its elasticity, has the effect that the block brake device 1 returns into its initial position during the transition from the application position into the release position, in which initial position the brake blocks 14 are away by almost the same distance from the assigned braking areas of the wheels 6.

As best illustrated in FIG. 1, the brake shoes 16 carrying brake blocks 14 are swivellably linked to the brake beams 10, 12 about swivelling axes extending parallel to the wheel axles 22. As a result, the brake shoes 16 can be tilted and, during the braking, can place themselves in a position-optimal manner against the braking areas of the wheels 6. The swivel bearing is implemented, for example, by brake shoe bolts 36 which are fitted through passage bores in fork-shaped receiving devices 38, each arranged at the end side on the brake beams 10, 12 and reaching around the brake shoes 16, as well as are fitted through a central passage bore of the respective brake shoe 16.

Figure 9:
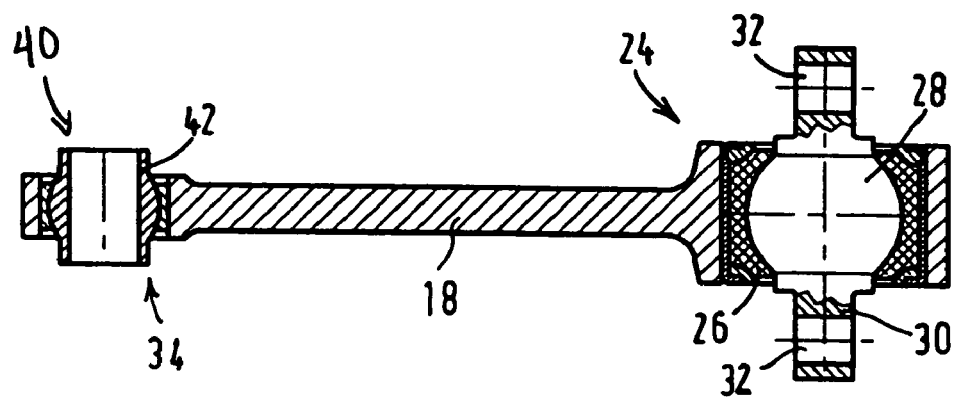
FIG. 9 is a cross-sectional view of an individual hanging lug.

The hanging lugs 18 are linked with their wheel-side end 34 directly to the brake shoes 16 by another spherical bearing 40 which comprises, for example, a spherical sleeve 42 disposed in the hanging lug 18, as illustrated in FIG. 9. The sleeve 42 is fastened by a hanging lug bolt on the assigned brake shoe 16. These kinematics permit an inclination of the hanging lugs 18 during transverse movements of the wheel axles 22, while the brake shoes 16, which are laterally situated at the radially projecting wheel flanges 44 of the wheels 6, continue to be held in a perpendicular position by the brake shoe bolt and in the wheel plane remain aligned essentially parallel to the wheel braking area.

Figure 3:
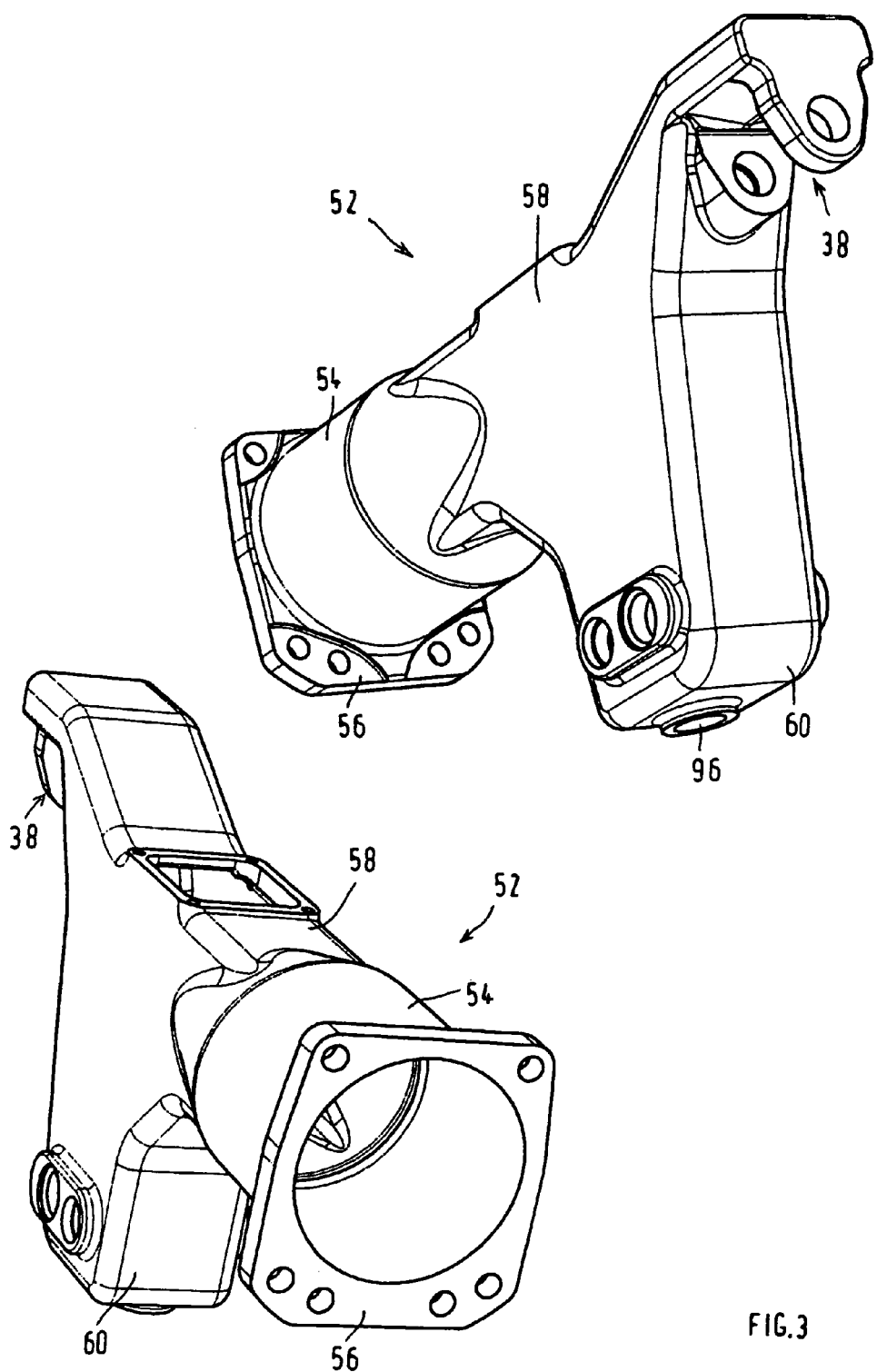
FIG. 3 is a view of housing halves of the housing of FIG. 1.
Figure 4:
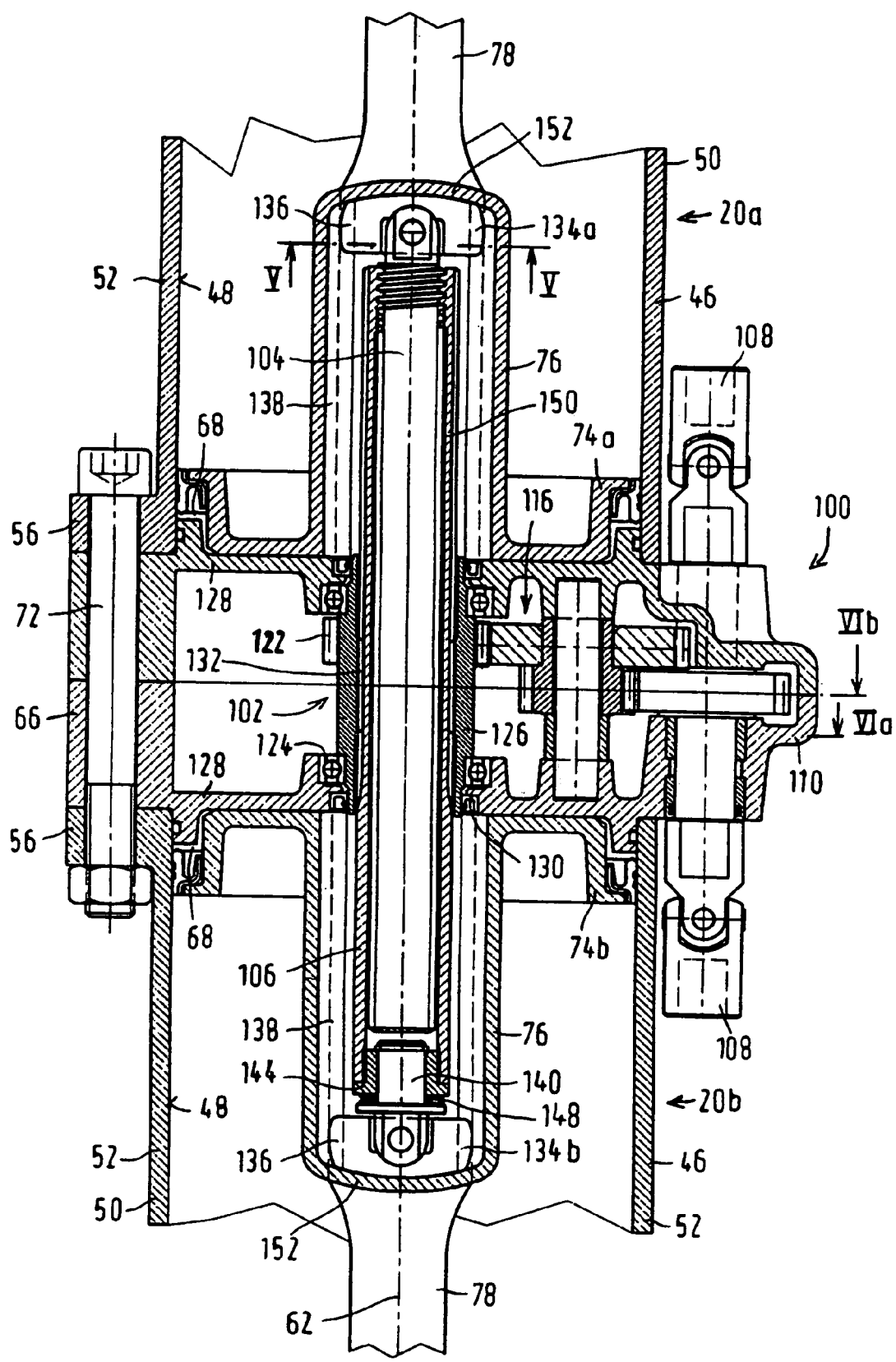
FIG. 4 is an enlarged sectional view of the cylinder piston drives.
Figure 6A:
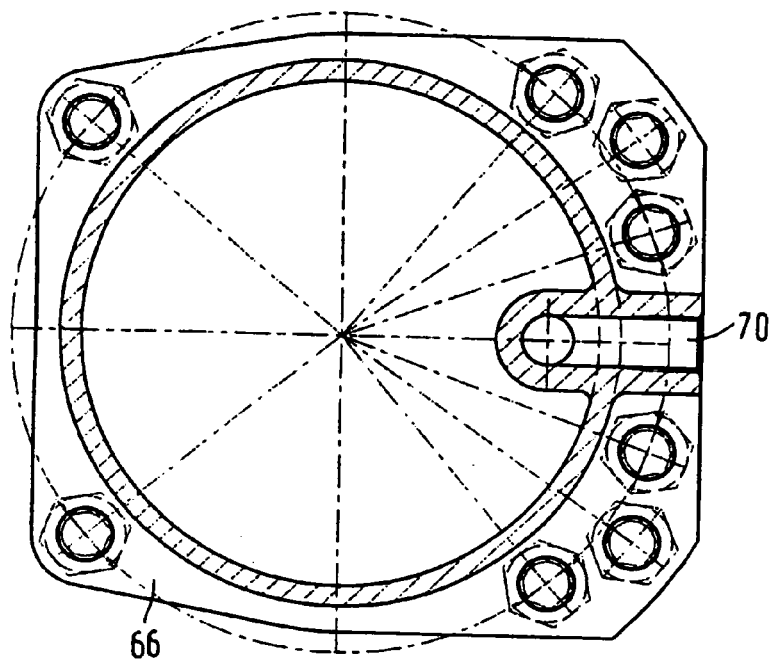
FIG. 6a is a sectional view along Line VIa of FIG. 4.
Figure 11:
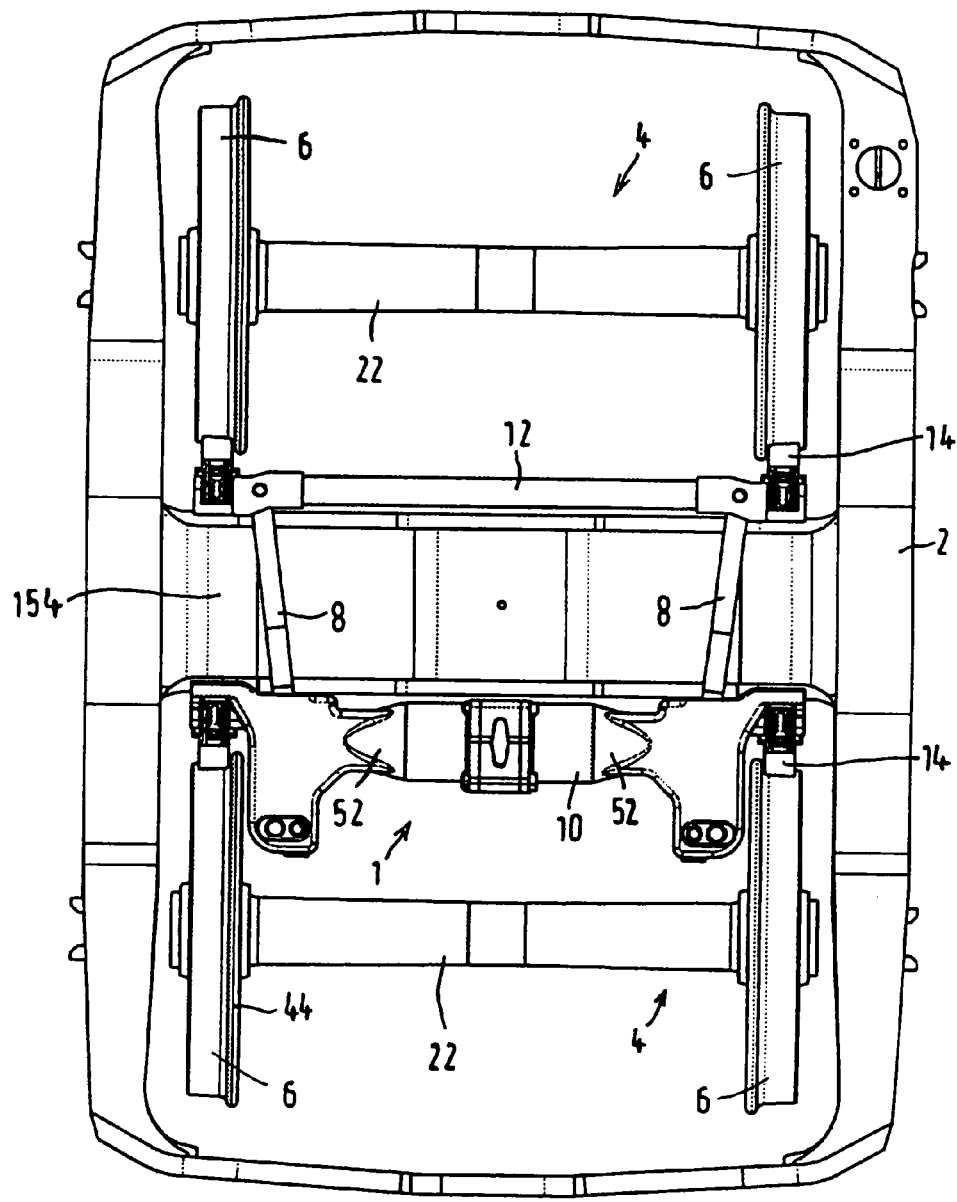
FIG. 11 is a view from below of a bogie with a block brake device according to another embodiment.

In the one brake beam 10 constructed as a hollow housing, two coaxial cylinder piston drives 20a, 20b, which operate in opposite directions, are integrated. In this case, at least sections of the brake beam 10 itself form the cylinders 46 of the cylinder piston drives 20a, 20b, as illustrated particularly in FIG. 2. More precisely, the cylinder faces 48 of the cylinders 46 of the cylinder piston drives 20a, 20b are an interior circumferential surface of the wall 50 of the hollow brake beam 10. As an alternative, the cylinder faces 48 can also be formed by cylinder liners carried by the wall 50 of the brake beam 10. As best illustrated in FIG. 11, the housing representing the brake beam 10 has two identically constructed housing halves 52 as hollow castings which can be turned down symmetrically with respect to a center plane of the bogie 2 and of which each housing half 52, in sections, forms a cylinder 46 of a cylinder piston drive 20a, 20b. These housing halves 52 are shown individually in FIG. 3, in which case the sections 54 of the housing halves 52 situated opposite one another in the mounted condition each have a cylindrical cross-section in order to form the cylinder face 48 on the interior circumferential surface 50. In addition, a flange 56 is shaped onto the end of the cylindrical section 54. Toward the outside, the cylindrical section 54 is followed by a section 58 with an essentially rectangular cross-section and with a bag-type shaping-out 60 which extends transversely to a center axis 62 of the cylinder piston drives 20a, 20b. One deflection gearing 64 respectively is accommodated in the bag-type shaping-out 60 for deflecting the piston movements taking place along the center axes 62 of the cylinder piston drives 20a, 20b to the pressing rods 8 arranged perpendicular thereto. The above-mentioned fork-shaped receiving devices 38 for the brake shoes 16 are shaped onto the ends of the housing halves 52 pointing away from the flanges 56. As best illustrated in FIG. 4, a two-shell intermediate housing 66 is arranged between the two housing halves 52. In the intermediate housing 66, a central pressure medium connection 70 is constructed which is visible in the sectional plane of FIG. 6a and supplies one pressure chamber 68 respectively of the cylinders 46 with pressure medium. The intermediate housing 66 is held between the housing halves 52, for example, by tie rods 72 applied to the flanges 56, which tie rods 72 are guided through passage bores of the intermediate housing 66. The other brake beam 12 constructed without a brake actuator has a conventional construction, for example, that of a double-U profile, and is provided at the end side also with fork-shaped receiving device 38 for brake shoes 16, as illustrated in FIG. 1.

Figure 2:
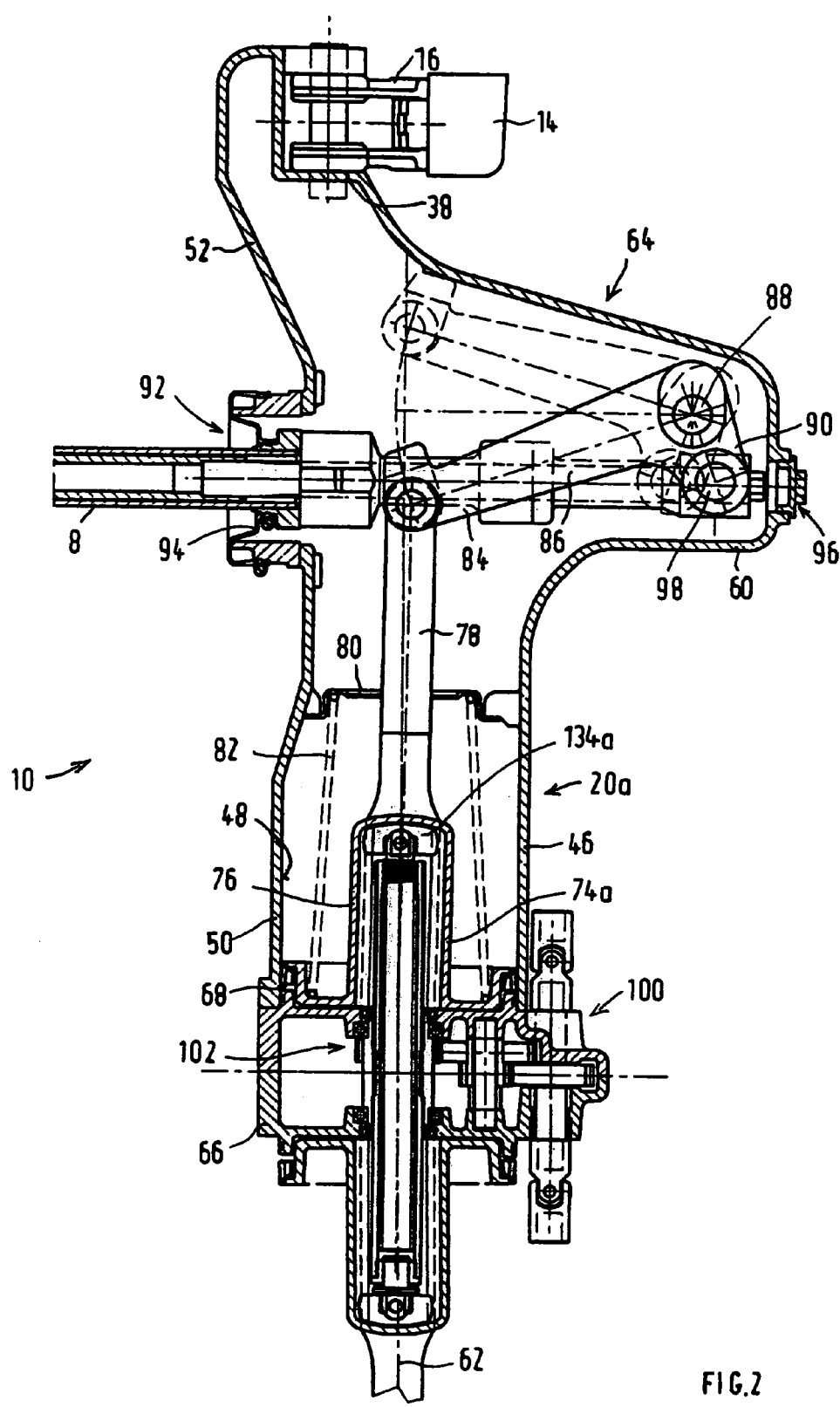
FIG. 2 is a sectional view of a part of the housing with a cylinder piston drive of the block brake device.

For reasons of scale, FIG. 2 shows only one housing half 52; however, the two housing halves, together with the subassemblies accommodated therein, have identical constructions. On their pressure side, the pistons 74a, 74b of the cylinder piston drives 20a, 20b each have a central cup-shaped shaping-out 76 from which, on the head side, a central piston rod 78 coaxial with the center axis 62, projects away to the outside. The pistons 74a, 74b are pretensioned in the release position by restoring springs 82 supported on intermediate bottoms 80 held in the housing halves 52. The piston rod 78 is linked to a longer leg 84 of a two-leg angle lever 86, which, for example, forms the deflection gearing 64. The deflection gearing 64 is completely enclosed by the bag-type shaping-out 60 of the corresponding housing half 52 and is swivellably disposed with respect to the latter by a bolt support 88. The two legs 84, 90 of the angle lever 86 are approximately perpendicular to one another. The shorter leg 90 is linked to an end of the assigned pressing rod 8 which projects from an opening 92 of the housing half 52 arranged transversely to the center axis 62 of the cylinder piston drives 20a, 20b. Depending on where the linking bore for the bolt support 88 of the angle lever 86 is arranged, a different transmission ratio can be achieved in each case, such as 4/1 or 3/1. Thus, a broad braking force spectrum is obtained for different rail vehicles without having to use different cylinder piston drives 20a, 20b and particularly other cylinder diameters for this purpose, so that the block brake device 1 can be used as a standardized same-construction unit. For sealing the housing interior, a flexible sealing device 94 is provided between the pressing rod 8 and the housing half 52. Furthermore, additional openings of the brake beam 10, for example, mounting openings 96, are closed by covers, so that the brake beam 10 forms a closed housing. As a result, the angle levers 86, together with their bolt support 88, the cylinder piston drives 20a, 20b as well as the linked connections 98 of the pressing rods 8 to the angle levers 86 are disposed inside the brake beam 10 protected from dust, splashing water and mechanical effects. A wear adjusting device, whose construction and method of operation is known and therefore does not need to be explained, is in each case integrated in both pressing rods 8.

Figure 6B:
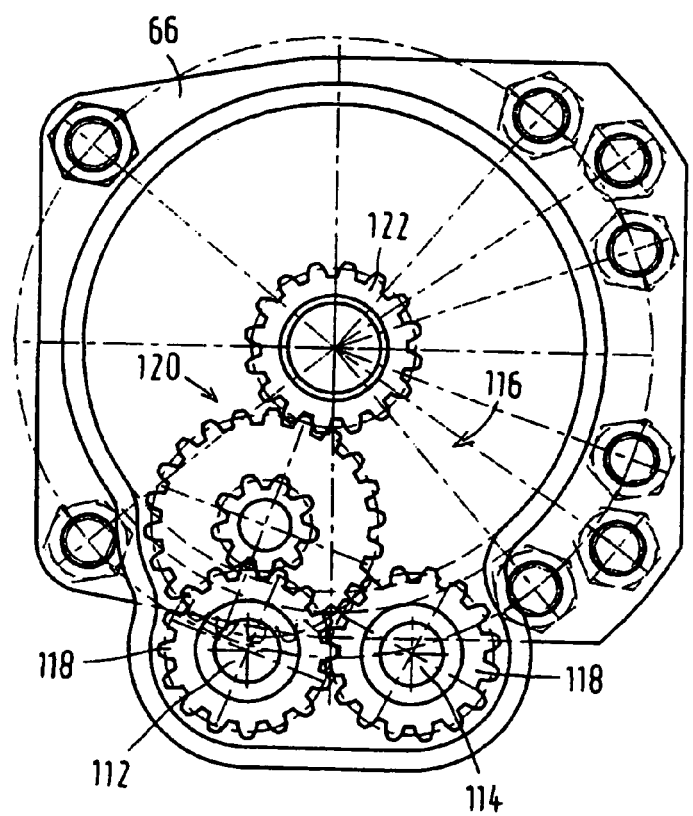
FIG. 6b is a sectional view along Line VIb of FIG. 4.

As illustrated best in FIG. 4, in the intermediate housing 66 forming a portion of the brake beam 10, at least a portion of the actuating mechanism 100 of a parking brake is accommodated. The actuating mechanism 100 comprises a nut screw drive 102 which can be rotatorily driven by parking brake application elements and is coaxial with respect to the cylinder piston drives 20a, 20b. The screw 104 is constructed so that it can strike against the pressure side of the piston 74a of the one cylinder piston drive 20a, and the nut 106 is constructed so that it can strike against the pressure side of the piston 74b of the other cylinder piston drive 20b. For the application and release of the parking brake, for example, hand wheels arranged on the lateral surface of the rail vehicle and not shown for reasons of scale, rotate two universal-joint shafts 108 which extend parallel to the wheel axles 22. The universal-joint shafts 108 lead from both sides into a projecting continuation 110 of the intermediate housing 66 and are in a rotating connection there with one input shaft 112, 114 of the toothed gearing 116 respectively, which is illustrated best in the sectional view according to FIG. 6b. Since, in practice, the parking brake is operated only from one side of the rail vehicle, the two input shafts 112, 114 carry mutually meshing gears 118, so that a rotating connection exists between the two universal-joint shafts 108. In this case, the parking brake is applied by a right-hand rotation of the hand wheels and is released by a left-hand rotation. For the transmission of the rotating movement to the nut screw drive 102, for example, two gear stages 120 are arranged behind the input shafts 112, 114, the output of the toothed gearing 116 taking place by way of a central gear 122 which is constructed in one piece (FIG. 4) with a coaxial cylindrical sleeve 126 disposed in the intermediate housing 66 preferably by a roller bearing 124. As an alternative, the central gear 122 can also be shrunk fit onto the sleeve 126. One movement sealing device 130 respectively is arranged between the ends of the sleeve 126 and the two bottoms 128 of the intermediate housing, in order to seal off the pressure chambers 68 of the cylinder piston drives 20a, 20b axially adjoining on both sides with respect to the interior of the intermediate housing 66.

Figure 5:
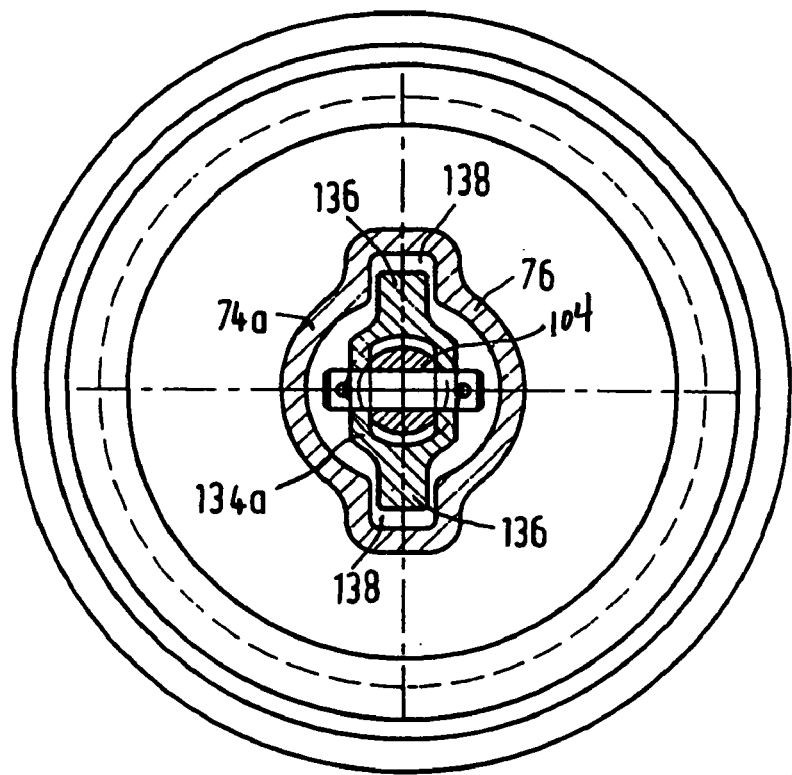
FIG. 5 is a sectional view along Line V—V of FIG. 4.

As best illustrated in FIG. 4, the sleeve 126 encloses the nut 106 of the nut screw drive 102 and is non-rotatably connected with this nut 106. In addition, the nut 106 is axially displaceably accommodated inside the sleeve 126. This can be implemented, for example, in that a coupling takes place between the sleeve 126 and the nut 106 by means of a splined shaft profile 132 or an adjusting spring. As a result, the entire nut screw drive 102 is disposed to be axially displaceable or floating with respect to the sleeve 126 in the direction of the center axis 62 of the cylinder piston drives 20a, 20b. Furthermore, the screw 104 and the nut 106 of the nut screw drive 102 are linearly displaceably guided within the cup-shaped shaped-out sections 76 of the assigned pistons 74a, 74b, as illustrated in the sectional view of FIG. 5. This is implemented, for example, in that the screw 104 and the nut 106 are provided on the end side with one stop body respectively 134a, 134b with preferably symmetrical lateral wings 136 which engage in complementarily shaped grooves 138 extending in the axial direction. The grooves 138 are constructed on the interior surfaces of the shaped-out sections 76 of the pistons 74a, 74b. The stop body 134a assigned to the screw 104 is non-rotatably connected with the latter, while the stop body 134b assigned to the nut 106 is connected with a shaft end 140 which is rotatable with respect to a sleeve-shaped end piece 144 coupled with the nut 106, for example, by an axial needle bearing 148. The screw 104 of the nut screw drive 102 can be screwed inside the nut 106 by a thread 150 so that a rotation of the sleeve 126 introduced by way of the toothed gearing 116 causes a screwing of the screw 104 relative to the nut 106, whereby the nut screw drive 102 is lengthened or shortened. In addition to the function as a guiding element for the screw 104 and the nut 106 or as a protection against torsion for the screw 104, these stop bodies 134a, 134b carry out another function as driving devices for the pistons 74a, 74b in the case of a parking braking. For this purpose, the stop bodies 134a, 134b are shaped on the head side in a complementary manner to the assigned bottoms 152 of the shaped-out sections 76 of the pistons 74a, 74b, for example, in a spherical shape. As a result, the described actuating mechanism 100 of the parking brake acts directly upon the pistons 74a, 74b of the cylinder piston drives 20a, 20b applying the service brake.

FIG. 4 shows the release position of the service brake and the parking brake, in which, in the moved-in position, the two pistons 74a, 74b contact the bottoms 128 of the intermediate housing 66. In this case, the stop bodies 134a, 134b contact the bottoms 152 of the pistons 74a, 74b in the shaped-out sections 76.

Figure 7:
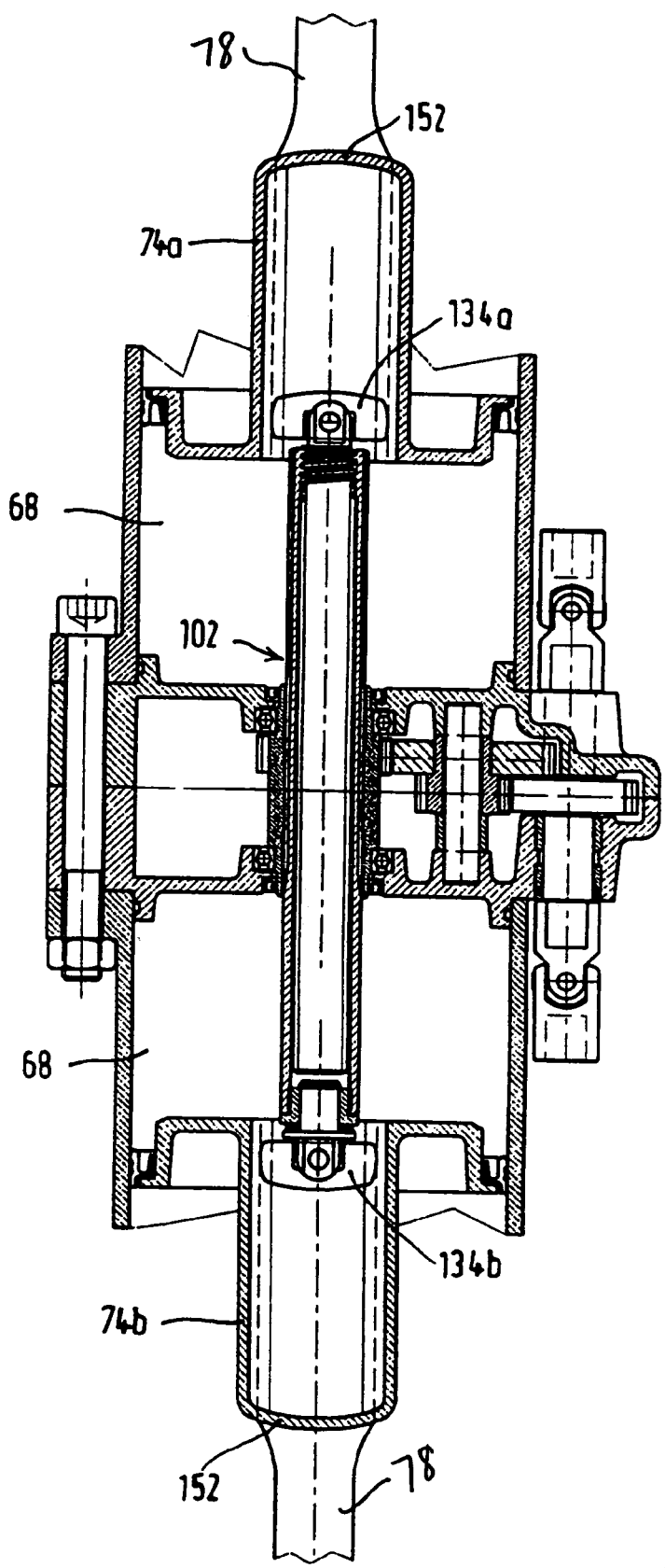
FIG. 7 is a view of the cylinder piston drives of FIG. 4 while the parking brake is released and the service brake is applied.

FIG. 7 shows the situation in which the service brake is applied by the admission of pressure to the pressure chambers 68 of the cylinder pistons drives 20a, 20b, but the parking brake is still released. Correspondingly, during a service braking, the two pistons 74a, 74b move against the effect of the restoring springs 82, similar to an opposed-cylinder arrangement, away from one another toward the outside and, by way of the piston rods 78 and the angle levers 86, operate the pressing rods 8, whereby the two brake beams 10, 12 are pressed away from one another and the brake blocks 14 are pressed against the braking areas of the wheels 6. Since the parking brake was not applied, the nut screw drive 102 is still in the screwed-in position, in which case the stop bodies 134a, 134b are away from the assigned bottoms 152 of the shaped-out sections 76 of the pistons 74a, 74b.

Figure 8:
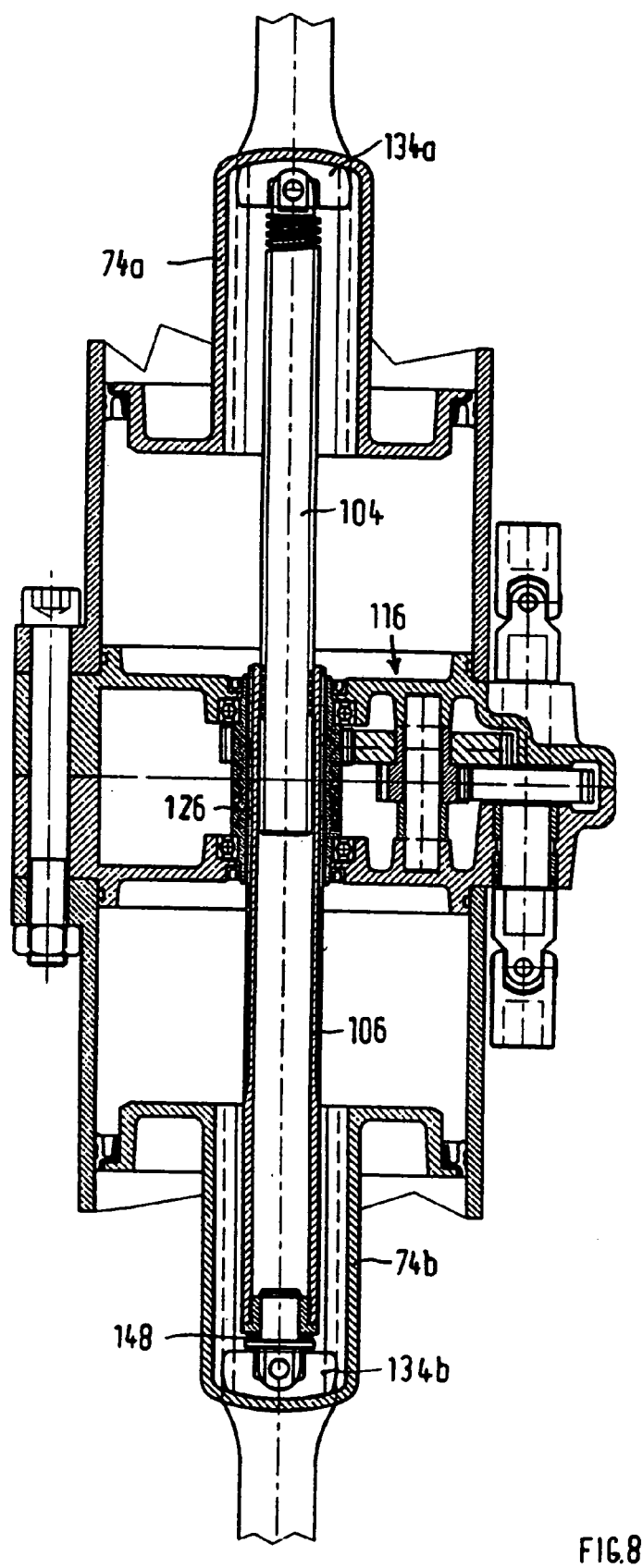
FIG. 8 is a view of the cylinder piston drives of FIG. 4 while the parking brake is applied.

In contrast, in the position according to FIG. 8, the parking brake is in the application position because, as a result of a rotating movement introduced into the toothed gearing 116, the sleeve 126 is caused to rotate and, as a result, the nut 106, which is freely rotatable with respect to its stop body 134b by means of the axial needle bearing 148, was screwed with respect to the screw 104 which is protected against torsion by means of its stop body 134a. As a result, the nut screw drive 102 was lengthened on both sides, in which case, the longitudinal force was transmitted by way of the stop bodies 134a, 134b to the pistons 74a, 74b, and the latter were then pushed toward the outside against the effect of the restoring springs 82. As described in the case of the service braking, the brake blocks 14 were moved into the brake engaging position. The situation of FIG. 8 can also be caused in that first the service brake and then additionally the parking brake is applied.

Figure 10:
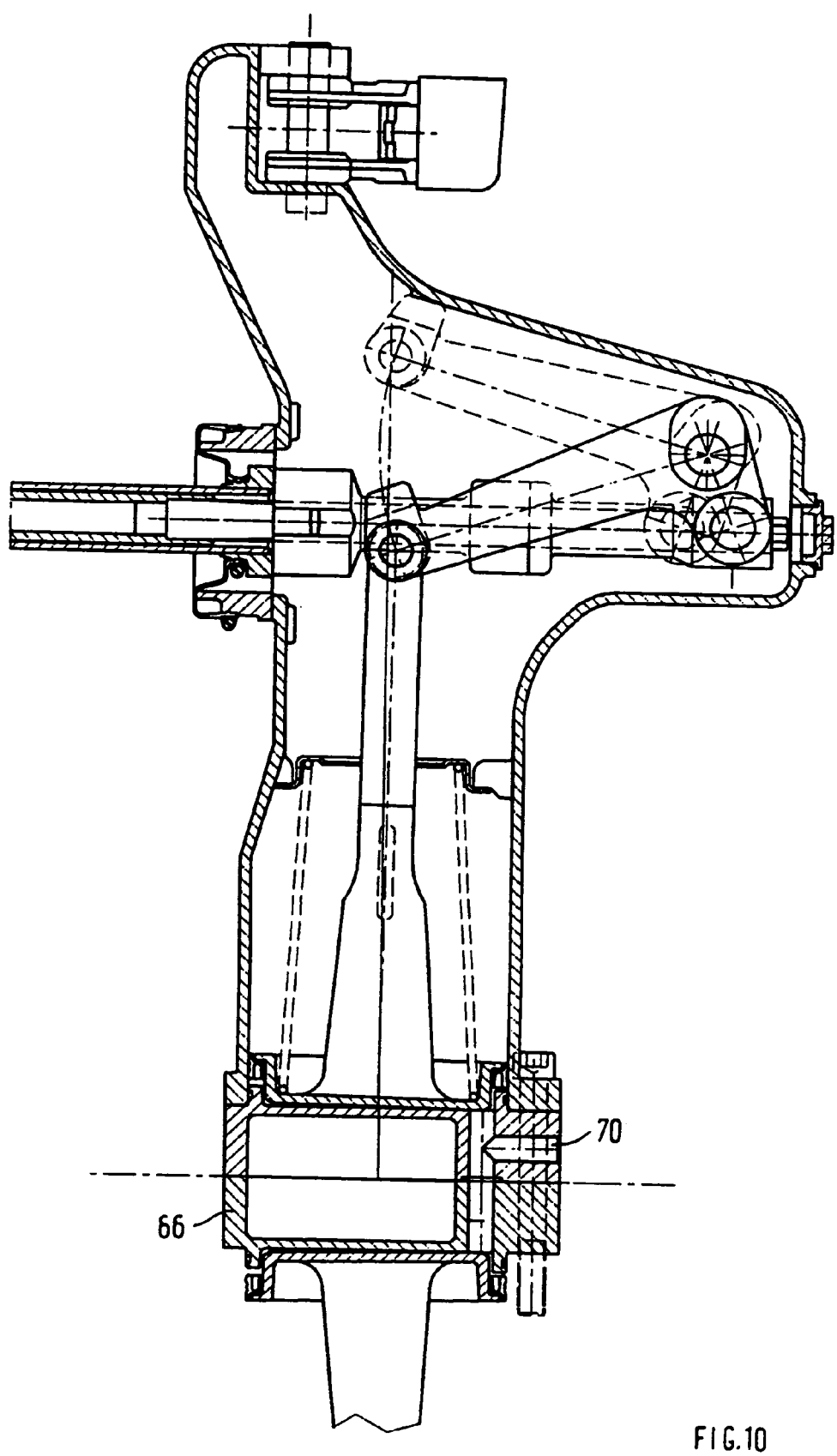
FIG. 10 is an enlarged sectional view of a block brake device according to another embodiment.
Figure 12:
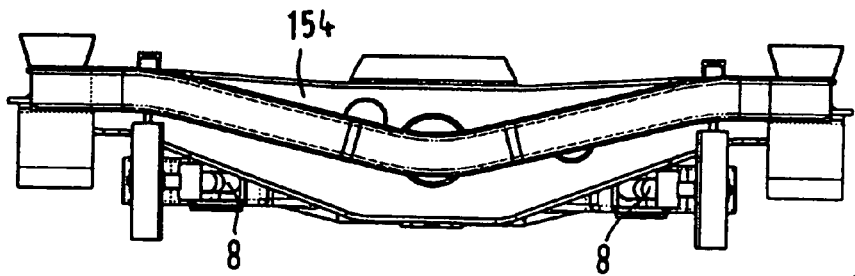
FIG. 12 is a frontal view of the bogie of FIG. 11.

In the additional embodiments according to FIGS. 10, 11 and 12, the parts remaining the same as in the preceding embodiment and having the same effect are indicated by the same reference numbers. In contrast to the first embodiment, in the embodiment of FIG. 10, no parking brake and therefore also no corresponding driving mechanism is present, so that only the joint pressure medium connection 70, together with feeding ducts, is present in the intermediate housing 66. However, the intermediate housing 66 is preferably identical in both cases in order to increase the number of identical parts of different brake variants.

In the first embodiment according to FIG. 1, the pressing rods 8 arranged perpendicular to the brake beams 10, 12 are guided below a cross member of the bogie. In contrast, in the embodiment of FIGS. 11 and 12, the pressing rods 8 are arranged at an angle with respect to one another and diverge, preferably starting from the one brake beam 10 in which the cylinder piston drives 20a, 20b are accommodated. As a result, the pressing rods 8 can be guided on the right and the left past a central, downward-pulled section of a cross member 154 of the bogie. As an alternative, the pressing rods 8 can also be guided through passage openings in the cross member 154. In the latter case, it is necessary that, for the mounting and demounting of the block brake device 1, the pressing rods 8 can easily be separated from the brake actuators 20a, 20b.

An additional balancing device 156 is shown in the embodiment according to FIG. 13 in order to avoid, in the release position of the block brake device 1, a one-sided contact of the brake blocks 14 with the wheels 6 or in order to achieve equally large application paths of the brake blocks 14. For this purpose, a telescopic device 158 is provided with a rod 162 linearly guided inside a cylinder 160. A frictional engagement is generated between the rod 162 and the cylinder 160 by a friction element 164, which frictional engagement counteracts a length change of the telescopic device 158. The telescopic device 158 is preferably arranged parallel to the longitudinal direction of the vehicle. In which case, the rod 162 is, for example, linked to the bogie 2 and the cylinder 160 is linked to the shorter leg 90 of the angle lever 86 in the center between its bolt support 88 and its linkage 98 at the pressing rod 8 at a linking point 166 which is indicated by identical measurements "a". The operation of the balancing device 156 will then be as follows: During a service braking, the pressing rod 8 is operated by a total path which is composed of the sum of the application path of the brake blocks 14 of the one brake beam 10 to the assigned wheels 6 and of the application path of the brake blocks 14 of the other brake beam 12 to the assigned wheels 6. In the case of equally large application paths, that is, in the case of brake blocks which are arranged at an equal distance or "symmetrically" with respect to the assigned wheels 6, the telescopic device 158 does not change its length. This is because the linkage point 166 of the cylinder 160 at the angle lever 86, during a braking, does not change its position with respect to the bogie 2 because of the displacement of the brake beam 12 carrying the angle lever 86 by half the total path in one direction and a simultaneous displacement because of the rotation of the angle lever 86 in the opposite direction. As a result, the position of the block brake device 1 hanging on the bogie 2 also remains unchanged in the release position. In the case of different application paths, that is, in the case of brake blocks 14 which are not arranged at an equal distance with respect to the assigned wheels 6, there is the risk that the brake blocks 14 will slip on or stay in contact with the wheels 6 even when the brake is released. When the service brake or the parking brake is operated, in this case, the brake blocks 14 of the brake beam 10 or 12 with the shorter application path are first applied to the assigned wheels 6, in which case, because the further operation of the cylinder piston drives 20a, 20b, the telescopic device 158 is lengthened or shortened while overcoming the frictional engagement between the rod 162 and the cylinder, until the longer application path of the brake blocks 6 of the other brake beam 10 or 12 has been covered. During the releasing of the brake, the two brake beams 10, 12 return into a symmetrical release position with application paths of the same length, in which case the frictional engagement acting in the telescopic device 158 prevents a returning into an asymmetrical position. This is known as slack adjusting. The hanging block brake device 1 is then newly aligned and centered with respect to the bogie 2.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A block brake device of a bogie of a rail vehicle containing two wheel sets with two wheels, respectively, the block brake device comprising:
   a first and a second brake beam each assigned to a wheel axle and extending parallel to the wheel axle, which brake beams carry brake blocks and are mutually connected by pressing rods which can be actuated by two pressure-medium operated cylinder piston drives for the braking engagement of the brake blocks with assigned braking areas of the wheels;
   at least a portion of the first brake beam forms a cylinder of the two pressure-medium operated cylinder piston drives;
   a cylinder face of the cylinder is formed by one of an inner circumferential surface of the wall of the first brake beam and a cylinder lining carried by the wall;
   the two pressure-medium operated cylinder piston drives are coaxial and operate in opposite directions and are integrated in the first brake beam;
   the first brake beam has two identically constructed housing halves which can be symmetrical with respect to a center plane of the bogie and which, at least in sections, form the cylinders of the two pressure-medium operated cylinder piston drives; and
   one deflection gearing for deflecting piston movement to the pressing rods is accommodated in an encapsulated manner in the housing halves.

2. The block brake device according to claim 1, wherein the two housing halves are constructed as hollow castings.

3. The block brake device according to claim 1, wherein the deflection gearing is formed by one angle lever respectively linked to one of the housing halves.

4. The block brake device according to claim 3, including receiving devices for brake blocks shaped at an end side to the housing halves.

5. The block brake device according to claim 1, including wear adjusting devices integrated in the pressing rods.

6. The block brake device according to claim 1, wherein the pressing rods are arranged essentially perpendicular to the wheel axles.

7. The block brake device according to claim 1, wherein the pressing rods are arranged at an angle to one another and diverge starting from the brake beam accommodating the at least one cylinder piston drive.

8. The block brake device according to claim 1, wherein the piston stroke of the at least one cylinder piston drive is larger than the piston diameter.

9. A block brake device of a bogie of a rail vehicle containing two wheel sets with two wheels respectively, the block brake device comprising:
   a first and a second brake beam each assigned to a wheel axle and extending parallel to the wheel axle, which brake beams carry brake blocks and are mutually connected by pressing rods which can be actuated by two pressure-medium operated cylinder piston drives for the braking engagement of the brake blocks with assigned braking areas of the wheels; and wherein
   at least a portion of the first brake beam forms a cylinder of the two pressure-medium operated cylinder piston drives;
   a cylinder face of the cylinder is formed by one of an inner circumferential surface of the wall of the first brake beam and a cylinder lining carried by the wall;

the two pressure-medium operated cylinder piston drives are coaxial and operate in opposite directions and are integrated in the first brake beam;

the first brake beam has two identically constructed housing halves which can be symmetrical with respect to a center plane of the bogie and which, at least in sections, form the cylinders of the two pressure-medium operated cylinder piston drives; and an intermediate housing arranged between the two housing halves, in which intermediate housing a central pressure medium connection is constructed which supplies both cylinders of the pressure-medium operated cylinder piston drives with pressure medium.

10. The block brake device according to claim 9, including at least a part of a driving mechanism of a parking brake in the intermediate housing.

11. The block brake device according to claim 10, wherein the driving mechanism of the parking brake comprises a nut screw drive which can be rotatorily driven by parking brake actuating elements and is coaxial to the pressure-medium operated cylinder piston drives, a screw of the nut screw drive being constructed such that it can strike against a pressure side of one piston and a nut of the nut screw drive being constructed such that it can strike against a pressure side of the other piston.

12. The block brake device according to claim 11, wherein introduction of the rotating movement takes place into the nut of the nut screw drive and in that the screw is disposed in a linearly displaceable manner and protected against torsion on the one piston, and the nut is disposed so that it can be linearly displaced but is freely rotatable on the other piston.

13. The block brake device according to claim 12, wherein the screw and the nut are guided within one centric cup-shaped shaped-out section respectively in the assigned piston.

14. The block brake device according to claim 13, wherein the screw and the nut are provided at an end side with one stop body respectively shaped complementarily to a bottom of the shaped-out sections of the pistons.

15. The block brake device according to claim 14, wherein the nut of the nut screw drive is disposed in an axially displaceable and co-rotatable manner inside a sleeve which is disposed in the intermediate housing in a coaxial, axially fixed and rotatable manner, which sleeve can be rotatorily driven for the application and release of the parking brake.

16. The block brake device according to claim 9, including wear adjusting devices integrated in the pressing rods.

17. The block brake device according to claim 9, wherein the pressing rods are arranged essentially perpendicular to the wheel axles.

18. The block brake device according to claim 9, wherein the pressing rods are arranged at an angle to one another and diverge starting from the brake beam accommodating the at least one cylinder piston drive.

19. The block brake device according to claim 9, wherein the piston stroke of the at least one cylinder piston drive is larger than the piston diameter.

20. A block brake device of a bogie of a rail vehicle containing two wheel sets with two wheels respectively, the block brake device comprising:

a first and a second brake beam each assigned to a wheel axle and extending parallel to the wheel axle, which brake beams carry brake blocks and are mutually connected by pressing rods which can be actuated by at least one pressure-medium operated cylinder piston drive for the braking engagement of the brake blocks with assigned braking areas of the wheels;

at least a portion of the first brake beam forms a cylinder of the at least one pressure-medium operated cylinder piston drive;

the block brake device is fastened as a brake module containing at least the first and second brake beams, the pressing rods, the brake blocks and the at least one pressure-medium operated cylinder piston drive in a hanging manner by hanging lugs to the bogie; and the hanging lugs are disposed at one end side at the bogie by spherical bearings with elastically damping elements, so that they can be swivelled on all sides and are linked at another end side to the brake shoes carrying the brake blocks.

21. The block brake device according to claim 20, including wear adjusting devices integrated in the pressing rods.

22. The block brake device according to claim 20, wherein the pressing rods are arranged essentially perpendicular to the wheel axles.

23. The block brake device according to claim 20, wherein the pressing rods are arranged at an angle to one another and diverge starting from the brake beam accommodating the at least one cylinder piston drive.

24. The block brake device according to claim 20, wherein the piston stroke of the at least one cylinder piston drive is larger than the piston diameter.

* * * * *